US009440832B2

(12) United States Patent
Vallés Navarro et al.

(10) Patent No.: US 9,440,832 B2
(45) Date of Patent: Sep. 13, 2016

(54) COUNTERWEIGHT BALANCING DEVICE FOR FILMING CRANES

(71) Applicants: Alfredo Vallés Navarro, Barcelona (ES); André Vallés Navarro, Barcelona (ES)

(72) Inventors: Alfredo Vallés Navarro, Barcelona (ES); André Vallés Navarro, Barcelona (ES)

(*) Notice: Subject to any disclaimer, the term of this patent is extended or adjusted under 35 U.S.C. 154(b) by 0 days.

(21) Appl. No.: 14/417,128

(22) PCT Filed: Dec. 20, 2012

(86) PCT No.: PCT/ES2012/000320
§ 371 (c)(1),
(2) Date: Jan. 23, 2015

(87) PCT Pub. No.: WO2014/016441
PCT Pub. Date: Jan. 30, 2014

(65) Prior Publication Data
US 2015/0210521 A1    Jul. 30, 2015

(30) Foreign Application Priority Data
Jul. 24, 2012  (ES) .................................. 201200756

(51) Int. Cl.
*H04N 5/225*       (2006.01)
*F16M 13/00*       (2006.01)
*B66F 11/04*       (2006.01)
*B66F 13/00*       (2006.01)

(52) U.S. Cl.
CPC .............. *B66F 11/048* (2013.01); *B66F 13/00* (2013.01); *F16M 13/00* (2013.01)

(58) Field of Classification Search
CPC ...... B66F 11/048; B66F 11/00; B66F 13/00; B66C 23/72; G03B 17/561; F16F 15/022; F16M 11/12; F16M 11/24; F16M 11/048; F16M 11/04; F16M 11/2092; F16M 11/2064; F16M 13/00; F16M 220/044
USPC ............... 248/123.2, 178.1, 187.1, 562, 588; 348/373, 375
See application file for complete search history.

(56) References Cited

U.S. PATENT DOCUMENTS 4,849,778 A * 7/1989 Samuelson ............ F16M 11/10
248/281.11

(Continued)

FOREIGN PATENT DOCUMENTS

EP          0638513      2/1995
ES          2388343 T    10/2012
(Continued)

*Primary Examiner* — Anita M King
(74) *Attorney, Agent, or Firm* — Davis & Bujold PLLC; Michael J. Bujold

(57) ABSTRACT

A counterweight balancing system for filming cranes that are mounted on a vehicle and used to film moving images. The filming crane (1) has a rotating center (4) with a counterweight system (2), on one side, and a filming camera (3), on the other side, which oscillate as if on a balance. A pantograph mechanism enables the counterweight system (2) to be maintained in relation to the ground, in the event of any ascending or descending movement of an arm, holding the filming camera (3), as a result of the system being equipped with articulated points (6, 7, 8 and 9), fixed shafts (10 and 11) and shafts (9 and 9') movable in relation to a central shaft of the crane (5), thereby forming the pantograph mechanism.

12 Claims, 3 Drawing Sheets

(56) References Cited

U.S. PATENT DOCUMENTS

| | | | |
|---|---|---|---|
| 6,752,541 B1* | 6/2004 | Dykyj | B66F 11/048 248/123.11 |
| 7,137,747 B2* | 11/2006 | Chapman | B66F 11/048 248/638 |
| 8,033,742 B1* | 10/2011 | Chapman | B66F 11/048 352/243 |
| 2005/0231634 A1 | 10/2005 | Chapman | |
| 2011/0031203 A1* | 2/2011 | Chapman | B66F 11/048 212/196 |

FOREIGN PATENT DOCUMENTS

| | | |
|---|---|---|
| FR | 2380492 | 9/1978 |
| FR | 2626957 | 8/1989 |
| NL | 9401448 | 4/1996 |

* cited by examiner

COUNTERWEIGHT BALANCING DEVICE FOR FILMING CRANES

FIELD OF THE INVENTION

The object of the present invention refers to a counterweight balancing device for filming cranes of the type that can be used for leveling the filming cranes mounted onto vehicles adapted for receiving said cranes and intended to record images while in motion; said equipment works withstanding the inertia resulting from the circulation of the vehicle and the movements of the camera head so that it has been devised a mechanism that affects the counterweight in order to improve vehicle stability and camera movement.

PRIOR ART

Film-making industry has ordinarily been making use of a number of moving means that support filming cranes for their purposes including motorized means and, more particularly, vehicles that support said filming cranes.

Naturally, these cranes, usually fixed by the center thereof to the vehicle, move in ail directions while being controlled by a remote control from the interior of the vehicle, whether with the car being stationary or circulating at high speed. These movements can generate a great deal of inertia that makes driving difficult, this causing the machine to foe very unstable and making accidents likely to happen if a high speed is required.

These cranes are Manufactured as balances are, that is, the pointer of the balance is the support of the crane and at the opposed arms thereof are positioned the camera and the counterweight system, respectively.

In the known art, due to the need to reach areas close to the ground or elevated areas with the camera, the center of gyration of the crane needs to be distant from the vehicle to keep the arms thereof from colliding with the driver's cab or with the rear part of the vehicle. The result causes the mass center of the assembly to be very elevated.

The above instability of the assembly becomes reduced if the center of gravity of the crane is located as close as possible to the ground. That is to say, the lower the mass center is, the faster and safer it will be possible to drive and work with the crane. It is therefore one of the main objects of the present invention to obtain a crane with a center of gravity located as low as possible and with the minimum weight.

In order to balance the movements of both the camera and the crane it is obtained with the known cranes not only an excessive weight but also a rear part that is too long, as will be explained below in more detail.

It is another of the main objects of the present invention to provide a counterweight device that permits a larger working area for the crane camera with a shorter length of the crane.

These and other advantages of the present invention will become more apparent throughout the description below.

BRIEF EXPLANATION OF THE INVENTION

The present invention describes a counterweight balancing device for filming cranes, for instance known counterweight systems of the art that are connected to the crane body via a pantograph system that maintains at all times the horizontality of the counterweight system.

A pneumatic piston associated to the movement of the counterweight introduces an elastic factor so configured as to compensate for the loss of leverage of the counterweight that results from the reduction of the distance of the mass center thereof to the center of the crane, this providing balance to the assembly.

It is in this manner how all the objects sought by the present invention have been obtained since it is achieved a significant reduction in the height of the mass center of the crane relative to the vehicle, this providing a higher stability to the assembly that affects ail the moving operations of the filming crane and the vehicle.

Consequently, filming operations in motion become safer and the camera can operate in conditions of higher stability since it is used on a crane that incorporates the counterweight balancing device of the present invention.

BRIEF EXPLANATION OF THE INVENTION

For a better understanding of the invention it is accompanied by sheets of drawings intended to be merely illustrative and non-limiting.

FIG. 1 shows a view of a vehicle that incorporates a filming crane with the counterweight system leveled relative to the plane of the ground in accordance with the present invention while

FIG. 3 shows another representation of the vehicle with the filming crane of FIG. 1 but with the counterweight system elevated and the filming crane at a low point. The counterweight system is kept leveled relative to the ground in accordance with the present invention while

Figure 5:
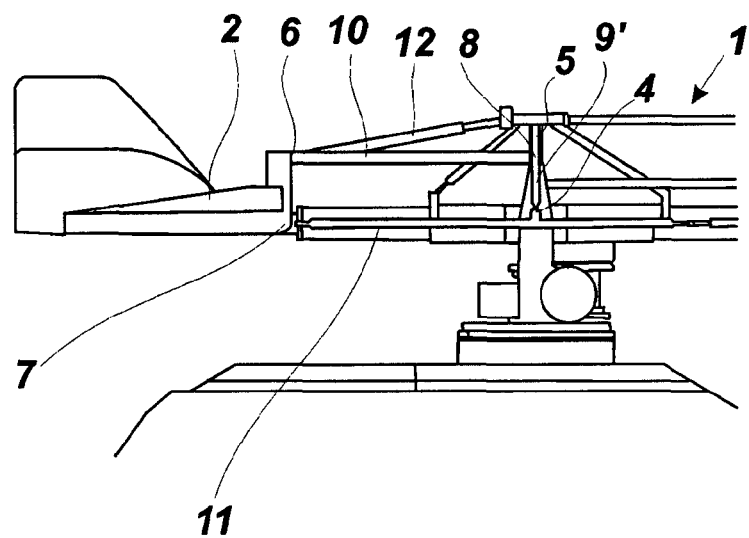

FIG. 5 provides an enlarged detail of the leveling mechanism of the present invention.

DETAILED EXPLANATION OF THE INVENTION

The present invention consists of a counterweight balancing device for filming cranes of the type of cranes that are mounted onto vehicles adapted for receiving said cranes and intended to record images while in motion, wherein the crane incorporates a pantograph that enables leveling of the counterweight system (2).

Figure 1:
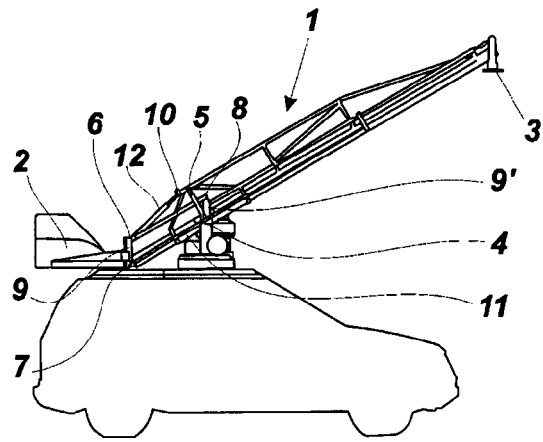
Figure 2:
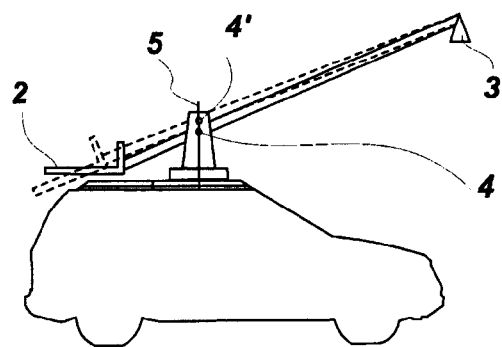
FIG. 2 shows a simplified view of a vehicle with a filming crane similar to that of the preceding figure wherein it is contrasted the present invention with the result of the earlier art by means of broken lines.
Figure 3:
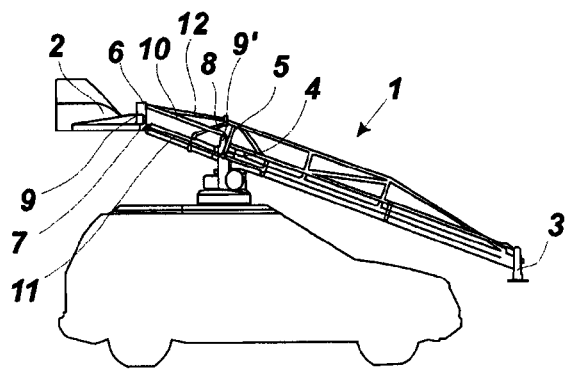
Figure 1A:
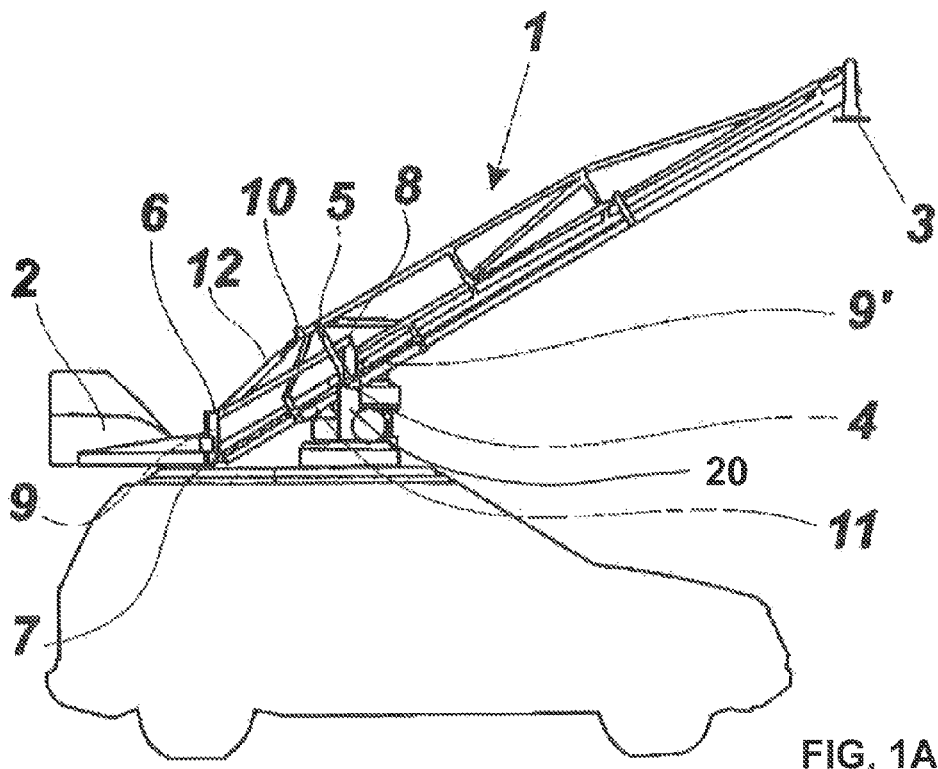
FIG. 1A is an enlarged view of FIG. 1.
Figure 3A:
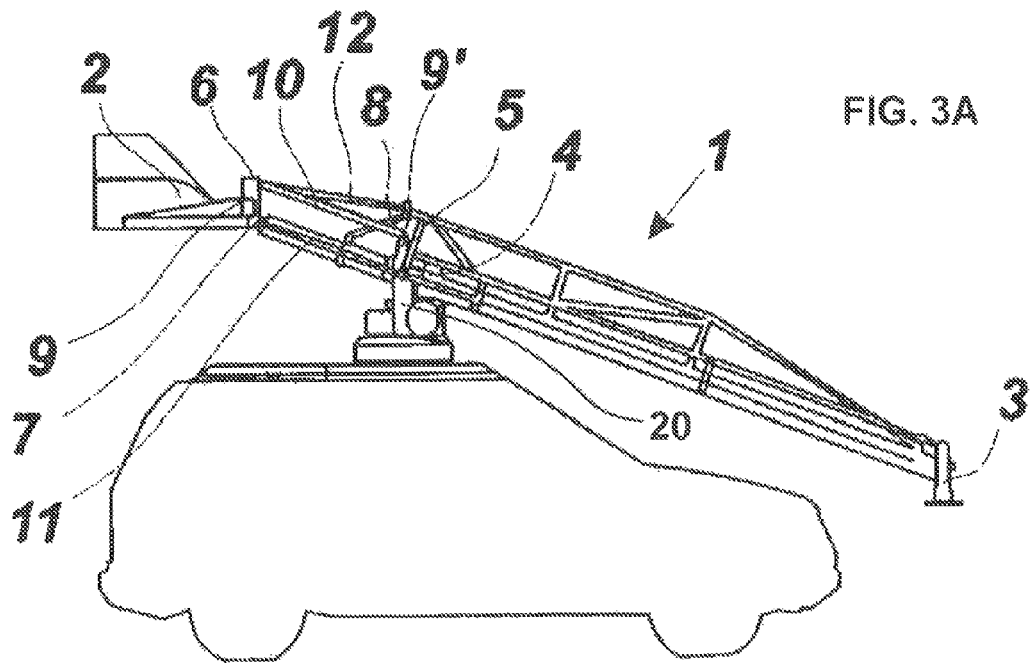
FIG. 3A is an enlarged view of FIG. 3.

The crane (1) supports at both its opposite end arms the counterweight system (2) that balances the camera (3) or the camera head which enables rotation of said arms, as if on a balance, from its pointer or middle point, which is the center of gyration (4) of the crane. In the earlier art, which the present invention improves, the center of gyration of the crane (4') is to be kept away from the vehicle, see FIG. 2, in order to avoid, collision of the counterweight system (2) or the camera (3) with the vehicle bodywork and to enable and ample movement of the camera.

Obviously, if it were possible to lower the center of gyration of the crane at the central shaft thereof (5), it would be possible to obtain a more stable and safer assembly as the mass center of the crane would also be lowered as a result, so that the crane would undergo less inertia while in motion and it would be facilitated both driving of the vehicle and the filming tasks.

To achieve the above objectives, the invention incorporates a pantograph mechanism having first and second articulation points (6 and 7) of the counterweight system (2) and first and second rotation points (4 and 8) of the frame (20), i.e., the articulation point (8) of a frame shaft (9') and the center of gyration (4) of arm. Articulations (6 and 8) are joined together by means of a crossbar (10).

The second articulation point (7) of the counterweight system (2) and the first rotation point (4), corresponding to the center of gyration (4) of the crane, are connected by shaft (11), which is a part of the arm of the crane.

Furthermore, first and second articulation points (6 and 7) of the counterweight, and first and second rotation points (4 and 8) of the frame (20) are also respectively connected by various bars or frame shafts (9 and 9').

The enlarged detail of FIG. 5 permits to appreciate the details of this pantograph that is incorporated to the balance of the counterweight system (2) of the crane (1).

Figure 4:
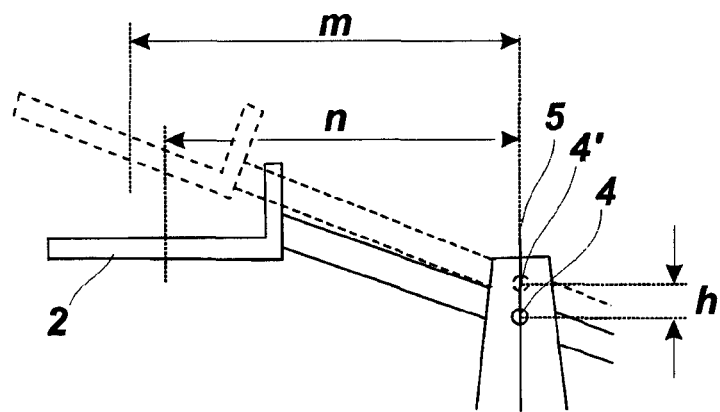
FIG. 4 represents a schematic detail of the variation of position relative to the center of gyration of the crane from the center of gravity of the counterweight system showing the known art in broken lines and the present invention in solid lines.

Operation is simple. When, for instance, the camera (3) is lifted by the crane (1), it takes place an opposite oscillation in the counterweight system (2). FIG. 4 shows the elevated height of the center of gyration (4') of the state of the art represented in broken lines relative to the center of gyration (4) of the present invention, represented in solid lines. The difference in height "h" is inevitable because the arms of the crane must in the known art avoid, with a lesser radius of gyration, the vehicle bodywork.

In the present invention articulations (6 and 8) are pushed forward of the central shaft (5) of the crane, keeping the verticality of axles (9 and 9') relative to the ground, such that thanks to articulations (6 and 7) the counterweight system always stays in a horizontal position.

The same occurs when, the crane lowers the camera (3) close to the ground. The counterweight system (2) is lifted and articulations (6 and 8) move backwards relative to the central shaft (5) of the crane (1) while keeping at all times shafts (9 and 9') vertical to the ground and the counterweight system (2) leveled and parallel to the ground.

The geometry of the movement of the counterweight system (2), in accordance with what has been described above, enables to design a crane with a lower pointer or center of gyration (4) and a mass center closer to the ground, thereby it being obtained one of the main objects of the present invention.

However, proceeding as described above brings about a further problem that has to be solved. As shown in FIG. 4, keeping the counterweight system (2) leveled relative to the plane of the ground causes the mass center of said counterweight system (2) to be closer to the central shaft (5) of the crane, (n<m), which would result in a smaller momentum that would in turn disturb the balance of the crane arms (1).

In order to solve this problem it is included a means of elastic resistance, such as a gas cylinder (12) that acts against the movement of approximation of the counterweight system (2) towards the central shaft (5) of the crane. Said counterweight system (2) must exercise some force against said pneumatic cylinder (12) for balancing the loss of leverage resulting from said approximation.

This gas cylinder (12) basically comprises a jacket that forms a cylinder containing gas at a certain pressure against which a piston pushed by a shaft or rod works. When the rod wants to come out it needs an effort or tractive work. By adjusting the pressure in the interior of the jacket it is facilitated movement or is increased the effort to move the rod.

The result is an adjustable and utterly stable assembly with a center of gravity that is lower than that of the prior art and is characterized in that it always keeps leveled the counterweight system (2) relative to the ground.

It is understood that in the present case details with regard to finishing and form may be variable insofar as they do not modify the basic idea of the invention.

The invention claimed is:

1. A counterweight balancing device for a filming cranes (1) mounted onto a mounting surface of a vehicle, the filming crane (1) facilitating support of a camera (3) intended to record images while in motion, the counterweight balancing device comprising:
    a frame (20) of the crane (1) mounting the crane to the vehicle and the frame supporting an arm, the arm having a first end and an opposite second end, and both first and second ends of the arm oscillate with respect to the frame (20) about a first rotation point (4);
    a counterweight (2) being arranged adjacent the first end of the arm, the camera (3) being supportable adjacent the second end of the arm, such that the counterweight (2) and the second end oscillate with respect to the frame (20) about the first rotation point (4);
    a pantograph mechanism pivotally connecting the counterweight (2) to the first end of the arm of the crane (1), and the pantograph mechanism pivotally connecting the counterweight (2) to the frame (20), so that the pantograph mechanism maintains a desired orientation of a bottom base of the counterweight (2) with respect to the mounting surface of the vehicle during both ascending or descending movement of the second end of the arm.

2. The counterweight balancing device for the filming crane according to claim 1, further comprising:
    a first articulation point (7) pivotally connected to the bottom base of the counterweight (2) with the first end of the arm;
    a first shaft (10) with a fixed length, a first end of the first shaft pivotally connected to a second rotation point (8) of the frame (20), the second rotation point (8) spaced from the first rotation point (4); and
    a second end of the first shaft (10) pivotally connected to the counterweight via a second articulation point (6) of the counterweight (2) which is spaced from the bottom base of the counterweight (2), such that the first shaft (10) has a variable orientation with respect to the arm of the crane (1) during movement thereof, thereby forming said pantograph mechanism.

3. The counterweight balancing device for the filming crane according to claim 1, further comprising an elastic resistance means (12) against the ascending or descending movements of said counterweight (2) relative to the frame (20) of the crane (1) for offsetting any variation of momentum caused by said ascending or descending movement.

4. The counterweight balancing device for the filming crane according to claim 3, wherein said elastic means (12) is a gas spring.

5. The counterweight balancing device for the filming crane according to claim 4, wherein a gas pressure of said gas spring (12) is adjustable.

6. The counterweight balancing device for the filming crane according to claim 1, further comprising:
    a first articulation point (6, 7) of the pantograph mechanism pivotally connecting and supporting one of an upper portion and a lower portion of the counterweight (2) to the first end of the arm of the crane (1);

a first shaft (10) of the pantograph mechanism has a fixed length, the first shaft pivotally connects and supports the other of the upper portion and the lower portion of the counterweight (2) to a second rotation point (8) of the frame (20) of the crane (1), and the second rotation point (8) of the frame (20) is remote from the first rotation point (4) of the frame (20), such that the first shaft (10) has a variable orientation with respect to the arm of the crane during movement thereof; and the first articulation point and the first shaft of the pantograph mechanism thereby pivotally connecting the counterweight (2) to the arm and the frame (20) of the crane (1), so that the pantograph mechanism maintains the bottom base, being generally planar, parallel to the mounting surface of the vehicle.

7. The counterweight balancing device for the filming crane according to claim 1, further comprising:

first, second and third shafts (10, 11, 12), the first (10) and the second (11) shafts have fixed lengths, and the third shaft (12) has an adjustable length;

a first end and a second end of the first shaft (10) are pivotally connected to a second rotation point (8) of the frame (20) and a first part of the counterweight via a first articulation point (6), respectively, such that the first shaft (10) has a variable orientation with respect to the arm of the crane during movement thereof;

a first end and a second end of the second shaft (11) are pivotally connected to a second part of the counterweight via a second articulation point (7) and the first rotation point (4), respectively, such that the second shaft (11) maintains a parallel orientation with the arm of the crane (1) during movement thereof; and a first end and a second end of the third shaft (12) are pivotally connected to the arm of the crane (1) and the first part of the counterweight via the first articulation point (6), respectively, such that the third shaft (12) has a variable orientation with respect to the arm of the crane (1) during movement thereof.

8. A counterweight balancing device for balancing a counterweight and a camera, both the counterweight and the camera being supported by a filming crane having an arm pivotally connected to a frame at a point of rotation; the frame of the filming crane mounted onto a mounting surface of a vehicle; the counterweight being arranged on a first end of the arm of the crane opposite a second end of the arm supporting the camera, such that when the arm pivots on the frame, the counterweight and the camera also oscillate with respect to the mounting surface of the vehicle; the counterweight balancing device comprising:

a pantograph mechanism comprising at least a first articulation point and a first shaft;

the first articulation point pivotally connecting and supporting one of an upper portion and a lower portion of the counterweight to the first end of the arm of the crane;

the first shaft having a fixed length and second and third articulation points, and the first shaft pivotally connecting and supporting the other of the upper portion and the lower portion of the counterweight to the frame of the crane remote from the point of rotation; and the pantograph mechanism thereby maintaining a desired relative orientation of the counterweight with respect to the mounting surface of the vehicle during any pivoting, rotating, ascending, and/or descending movement of the arm of the crane relative to the mounting surface of the vehicle.

9. The counterweight balancing device for balancing the counterweight and the camera, according to claim 8, further comprising:

a piston having an adjustable length, pivotally connecting the upper portion of the counterweight to the first end of the arm of the crane thereby providing an elastic resistance means against any ascending or descending movements of the arm for offsetting any variation of momentum caused by the ascending or descending movement;

the first articulation point pivotally connecting the lower portion of the counterweight to the first end of the arm of the crane; and the first shaft pivotally connecting the upper portion of the counterweight to the frame of the crane.

10. A counterweight balancing device for balancing a camera intended to record images while in motion being mounted to a mounting surface of a vehicle, the counterweight balancing device comprising:

a filming crane having an arm pivotally connected by a frame at a point of rotation to a base mounted onto the mounting surface of a vehicle;

a counterweight, being arranged on a first end of the arm of the crane opposite a second end of the arm supporting the camera, such that when the arm pivots on the frame at the point of rotation, the counterweight and the camera also oscillate with respect to the mounting surface of the vehicle;

a pantograph mechanism comprising at least a first articulation point and a first shaft, the first articulation point pivotally connecting and supporting one of an upper portion and a lower portion of the counterweight to the first end of the arm of the crane;

the first shaft having a fixed length, the first shaft pivotally connecting and supporting the other of the upper portion and the lower portion of the counterweight to the frame of the crane, such that the first shaft has a variable orientation with respect to the arm of the crane during movement thereof; and the pantograph mechanism thereby maintaining a desired relative orientation of the counterweight with respect to the mounting surface of the vehicle during movement of the arm of the crane with respect to the mounting surface of the vehicle.

11. The counterweight balancing device for balancing the camera according to claim 10, further comprising a piston having an adjustable length, the piston pivotally connecting the upper portion of the counterweight to the first end of the arm of the crane, and the piston providing an elastic resistance means against any movements of the arm and thereby offsetting any variation of momentum caused by movements of the arm.

12. The counterweight balancing device for balancing the camera according to claim 10, wherein the first articulation point pivotally connects the lower portion of the counterweight to the first end of the arm which oscillates about the point of rotation; and the first shaft pivotally connects the upper portion of the counterweight to a second articulation point of the frame, and the second articulation point is remote from the point of rotation.

* * * * *